(No Model.)
J. ZIMMERMAN.
LAMP FOR GENERATING ACETYLENE GAS.
No. 600,630. Patented Mar. 15, 1898.
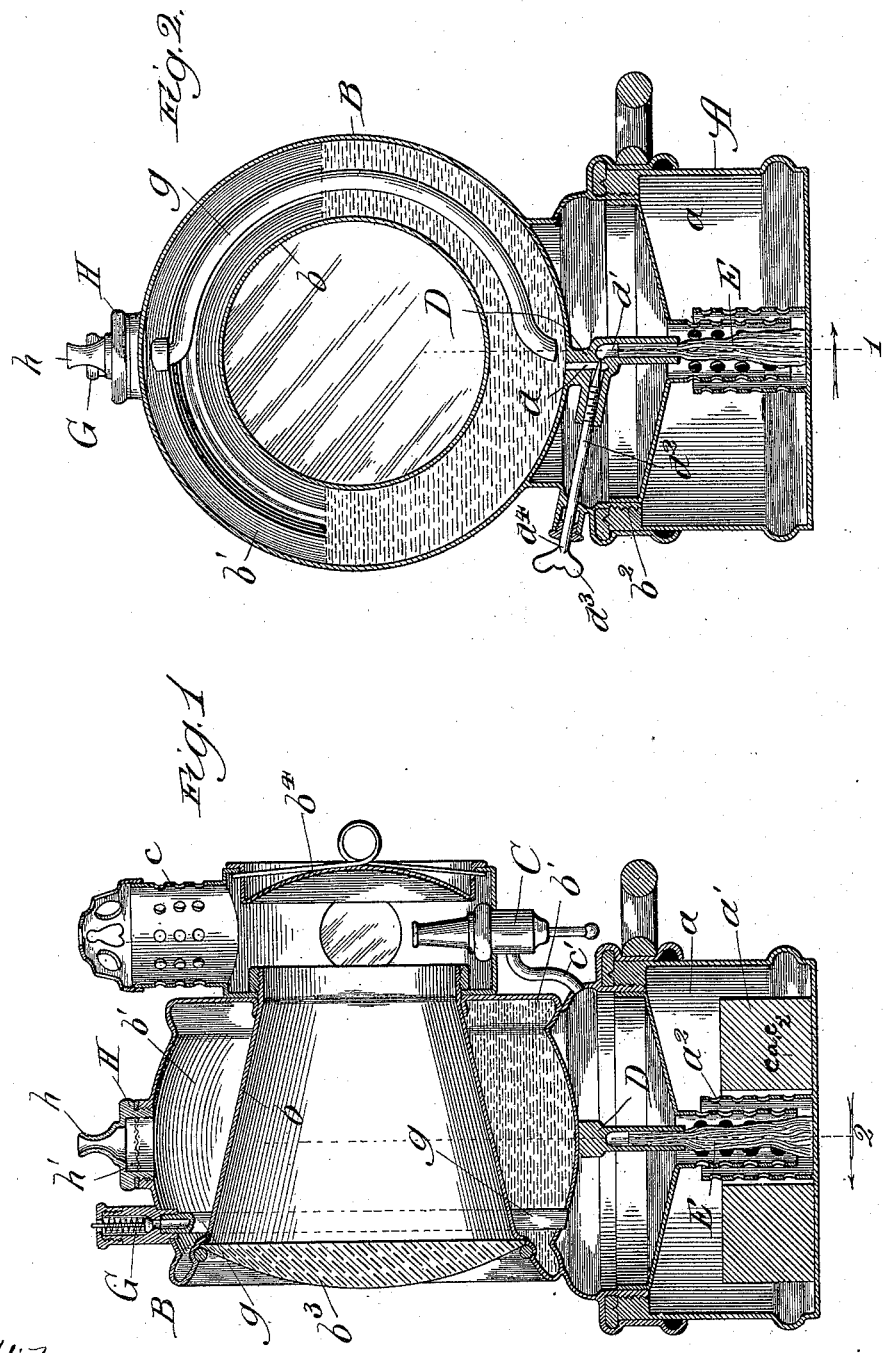
Witnesses:
Inventor:
John Zimmerman,
By Benning & Benning & Sheridan,
Attys.

UNITED STATES PATENT OFFICE.

JOHN ZIMMERMAN, OF CHICAGO, ILLINOIS.

LAMP FOR GENERATING ACETYLENE GAS.

SPECIFICATION forming part of Letters Patent No. 600,630, dated March 15, 1898.

Application filed June 12, 1897. Serial No. 640,463. (No model.)

*To all whom it may concern:*

Be it known that I, JOHN ZIMMERMAN, a citizen of the United States, residing at Chicago, in the county of Cook and State of Illinois, have invented certain new and useful Improvements in Lamps for Generating and Burning Acetylene Gas, of which the following is a specification.

My invention relates particularly to that class of lamps in which carbid of calcium or similar gas-producing material is placed and water or vapor fed thereto, which, being decomposed, generates acetylene or similar gases; and the invention relates especially to that class of lamps which is adapted for use on velocipedes and similar vehicles.

The object of my invention is to provide a simple, economical, and efficient lamp for generating and burning acetylene gas; and the invention consists in the features, combinations, and details of construction hereinafter described and claimed.

In the accompanying drawings, Figure 1 is a vertical sectional elevation of a lamp constructed in accordance with my improvements, taken on line 1 of Fig. 2; and Fig. 2, a similar view taken on line 2 of Fig. 1, looking in the direction of the arrow.

In the art to which this invention relates it is well known that there is considerable danger in generating acetylene or similar gases from carbid of calcium by bringing water into contact with the gas-producing substances owing to the fact that if the burner be closed and no other means of escape be provided for the excess of pressure of gas the lamp is liable to explode. Further, that when the water or liquid is shut off there is generally sufficient moisture left in the generating-chamber to form a quantity of gas, and this, in connection with the gas already in the chamber, is liable to produce an explosion. It is further well known that the gas in most apparatuses as now constructed is formed by what is known as the "high-pressure" process—that is, the gas is formed in such quantities that a high pressure is allowed to form in the generating-chamber for the purpose of operating intermediate feeding mechanisms—viz., such mechanisms as will govern or control the feeding of water or liquid to the carbid. This process is exceedingly dangerous, owing to the fact that when the use of the gas is shut off the pressure continues to form and is liable to reach such a state as will cause disruption of the apparatus and liability to injure the operators. My improvement therefore is designed, primarily, to improve on these constructions by providing a lamp in which the water or flow of moisture can be regulated in small quantities and which is fed in by force of gravity, in connection with the means for carrying off the gases as soon as formed, as will be more fully hereinafter described.

In constructing a lamp in accordance with my improvements I make a base portion A of the desired size and shape, preferably circular in contour, and which has a chamber $a$, in which a cake $a'$ of calcium carbid may be inserted. The calcium carbid is preferably in the shape of a circular ring—that is, a cake having a central perforation, so that it may slip over a perforated tube $a^2$, which is located in the central portion of the generating-chamber, as shown in Fig. 1.

To provide a liquid-holding chamber, I make an upper circular portion B, which is provided with an inner conical portion $b$, extending transversely through the same, so as to form an annular chamber $b'$, in which the liquid may be held. The bottom portion of this liquid-casing is provided with screw-threads $b^2$, adapted to engage with the threaded opening in the upper portion of the base and firmly screw such parts together. The conical piece $b$, as above noted, forms a portion of the reflector of the lamp and is provided with a lens $b^3$ at the front portion and a parabolic reflector $b^4$ at the rear portion. The burner proper, C, is inserted at the rear part of the upper case between the curved and the conical reflector portions, and a perforated chimney $c$ is supplied to the lamp directly above the burner portion. The burner is connected by means of a supply-pipe $c'$ with the generating-chamber, as shown in Fig. 1, and such supply-pipe is at all times left free or open, so that as fast as the gas is formed it may pass through and be consumed or dissipated in the atmosphere.

To feed water or liquid as desired to the generating-chamber, I provide a feeding-tube D, preferably irregular in shape—that is, it is provided with two channels $d$ and $d'$, arranged out of alinement, while the perforation that connects such channel is opened or closed by means of a needle-valve $d^2$, which is passed through the casing and has its threaded portion engaging with a threaded opening in an enlargement of the feed-tube. The valve-stem is provided with thumb-wings $d^3$ on the outer portion thereof and the casing with a stuffing-box $d^4$ to seal the opening through which the valve-stem is passed. It will thus be seen that the water or liquid may be fed in as desired in such quantities that the gas forming may be readily drawn off without liability to disrupt or destroy the lamp. If the water were made to pass through by the force of gravity alone and unobstructed, it would come in contact with the carbid in the shape of drops, so that there would be periods when the gas was forming in relatively large quantities when compared with the times between the falling of the drops. In order to overcome this objection and prevent these fluctuations in the forming of the gas, I provide the lower part of the feeding-tube with a wick portion E, so that the water contacts the wick and passes through in a constant limited supply, the result being the formation of the gas in a uniform and limited manner.

In order to provide for emergencies, it is desirable that a safety puppet-valve be provided, so that the gas if formed too rapidly may pass out through the same or the excess of pressure from any cause may be passed out through such valve. In order to accomplish this result, I preferably arrange a puppet-valve G on the upper part of the lamp and connect it by means of a semicircular tube $g$ with the generating-chamber. This semicircular tube is passed around through the annular liquid-holding chamber. If an excess of gas be formed, such excess of pressure will pass through this semicircular tube, lift the puppet-valve against the tension of its spring, and allow the surplus pressure to pass out into the atmosphere.

There are times when the water would fail to pass through the feeding-tube as quickly as desired, so that it is necessary to have some means for forcing the water through and cleaning the channel. In order to accomplish this result, I provide a portion of the casing with an opening, in which is inserted a threaded plug H, having a nipple portion $h$, and a screen $h'$, interposed between the opening in the nipple and the water-chamber. A rubber tube may be passed over this nipple and a force-pump connected therewith to either force water through the chamber or compressed air, as desired, which will act to clean out the chamber or feed-tube or force the water into the same to pass out more readily.

I claim—

1. A lamp for generating and burning acetylene gas, in which there is combined a base portion provided with a generating-chamber, an upper portion provided with an annular liquid-holding chamber, the inner walls of which form a portion of the reflector, a feed tube or pipe for conveying the liquid by force of gravity from the liquid-chamber to the generating-chamber, a valve in the feed-tube adapted to open and close the same and be operated by manual force, and a burner connected with the generating-chamber and having a free and unobstructed conduit between the generating-chamber and the burner-opening so that gas may be formed under low pressure and consumed or passed to the atmosphere, substantially as described.

2. A lamp for generating and burning acetylene gas, in which there is combined a base portion provided with a generating-chamber, an annular liquid-holding chamber in the upper portion, the inner walls of which form a portion of the reflector, a feed-tube connecting the liquid-chamber with the generating-chamber and provided with channels out of line with each other, a screw-valve for opening and closing the passage in the feed-tube, a wick portion in the lower part of the feed-tube, and a burner connecting with the generating-chamber and having a free and unobstructed connection with such chamber so that the gas may pass out as it is formed under low pressure and be consumed or dissipated, substantially as described.

3. A lamp for generating and burning acetylene gas, in which there is combined a base portion having a generating-chamber, an upper portion provided with an annular liquid-holding chamber, the inner walls of which form a portion of the reflector and having threaded engagement with the base portion, a feed-pipe for feeding the liquid by force of gravity to the generating-chamber and provided with a screw-valve to open and close the channel in such feed-pipe, a wick in the lower portion of such feed-pipe to provide for uniform feeding of the water or liquid, a safety puppet-valve connected with the generating-chamber, an opening in the liquid-holding chamber provided with a plug having a nipple extending therefrom, such nipple having a passage through the same, a screen interposed between the opening of the nipple and the liquid-holding chamber, and a burner portion connected with the generating-chamber and having a free and unobstructed passage between the burner-opening and the generating-chamber, substantially as described.

JOHN ZIMMERMAN.

Witnesses:
 THOMAS F. SHERIDAN,
 THOMAS B. MCGREGOR.